United States Patent Office 3,362,979
Patented Jan. 9, 1968

3,362,979
MIXTURES OF METHYLENE-BRIDGED POLY-
PHENYL POLYISOCYANATES
Floyd E. Bentley, Austin, Tex., assignor to Jefferson
Chemical Company, Inc., Houston, Tex., a corporation of Delaware
No Drawing. Original application Jan. 2, 1964, Ser. No.
335,396. Divided and this application May 22, 1964,
Ser. No. 369,581
4 Claims. (Cl. 260—453)

ABSTRACT OF THE DISCLOSURE

Mixtures of polyisocyanates represented by the following formulae:

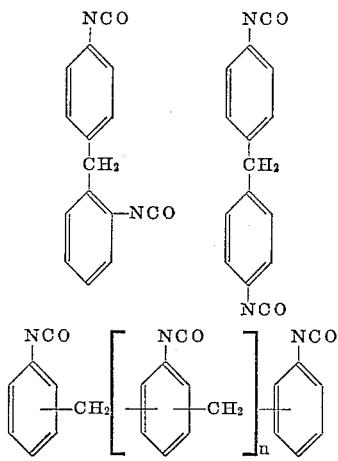

wherein $n$ in the formula has a value of from 1 to 3 and the mixture contains from 20% to 100% by weight of the two isomeric diisocyanates, of which 20% to 95% is the 2,4'-isomer, are useful as isocyanate components in the manufacture of polyurethanes.

---

This invention relates to polyfunctional polyaryl compounds. More particularly, the present invention is directed to polyaminopolyphenylmethanes of a new isomer distribution, a method for the preparation of such polyamino compounds, the preparation of new polyisocyanate isomer mixtures therefrom and the production of polyurethanes from such polyisocyanates.

This application is a division of copending application Ser. No. 335,396, filed Jan. 2, 1964 and entitled, "Functional Polyaryl Compounds and the Preparation and Utilization Thereof," which application Ser. No. 335,396 is, in turn, a continuation-in-part of copending application Ser. No. 243,648, filed Dec. 10, 1962, now abandoned, and entitled, "Polyamine Preparation."

It has heretofore been proposed to react aniline with formaldehyde in the presence of a strong mineral acid, such as hydrochloric acid, whereby a reaction occurs between the corresponding aniline hydrochloride and formaldehyde to provide a reaction mixture which, on neutralization with a base, may be treated to recover polyphenylamines composed principally of polyphenylamines having the following structural formulae:

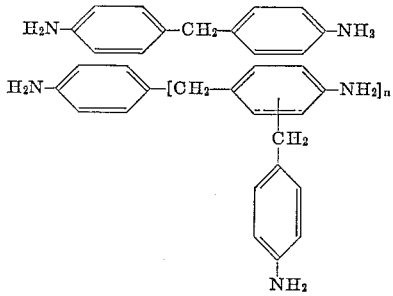

wherein $n$ is an integer having a value of 1 to 3 and normally has an average value of about 1.

Although the results obtained have been satisfactory in the sense that the above-indicated products can be formed, the process has left much to be desired. For example, it is necessary to utilize large quantities of both a mineral acid and a base which adversely affect the economics of the process and also the ease of conducting the reaction. In addition, the use of large quantities of mineral acids and bases presents a severe corrosion problem. Still further, the principal diaminodiphenylmethane that is formed is 4,4'-diaminodiphenylmethane. Thus, I have discovered that normally less than about 5 wt. percent of the 2,4-diphenylmethane isomer is formed. As a consequence, when a diaminodiarylmethane reaction product prepared in the conventional manner is converted to a diisocyanatodiphenylmethane reaction product, the diisocyanate product will have a comparatively high melting point and an undesirably high reactivity. As a consequence, it is normally necessary to use a prepolymer when polyurethanes are to be prepared from a conventional product composed primarily of 4,4'-diisocyanate (i.e., by initially reacting the diisocyanate with a limited quantity of a hydroxy-terminated polyether or polyester to provide an isocyanato-containing prepolymer). The prepolymer is then reacted with an additional amount of hydroxy-terminated polyester or polyether to provide a polyurethane.

The foregoing and other shortcomings are overcome in accordance with the process of the present invention, which provides new mixtures of 2,4'-diaminodiphenylmethane with 4,4'-diaminodiphenylmethane and, in particular, mixtures containing from about 20 to about 95 wt. percent of the 2,4'-isomer and, correspondingly, from about 80 to about 5 wt. percent of the 4,4'-isomer. These mixtures may be converted to the corresponding isocyanates to provide new mixtures of isocyanates that are liquid and are of particular utility in the preparation of polyurethane reaction products such as polyurethane elastomers, polyurethane foams, etc.

The polymethylene polyphenylamine process of the present invention may be briefly described as a process wherein formaldehyde or a polymer thereof is brought into contact with aniline in the presence of a solid acidic catalyst whereby a reaction mixture is formed which is composed principally of diaminodiphenylmethane and higher molecular weight condensation polymers of the formaldehyde and the aniline. The products of the reaction mixtures, as indicated, will have an isomer distribution which is significantly different from the isomer distribution obtained by the use of a strong mineral acid. For example, with aniline, the reaction product of the present invention may comprise dimers and higher molecular weight condensation products, such dimers having the following formulae:

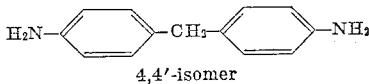

4,4'-isomer

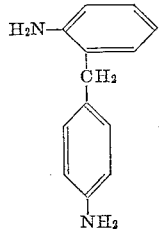

2,4'-isomer

Thus, in accordance with the present invention, it is possible to obtain a mixture of 2,4'-diphenylmethane with 4,4'-diaminodiphenylmethane containing from about 15 to about 95 wt. percent of the 2,4'-isomer (and preferably, about 30 to 95 wt. percent). In contrast, I have found that the conventional method of synthesis via the amine hydrochloride produces a product containing in the order of about 5 wt. percent of the 2,4'-isomer, at best.

The catalyst to be employed in accordance with the present invention may be generically defined as a solid acidic siliceous catalyst, such as acid-treated siliceous clays, silica-alumina cracking catalyst, silica magnesia, etc. However, more basic materials, such as, for example, tungsten oxide, vanadium oxide and titanium oxide are not effective catalysts for the reaction.

A silica-alumina cracking catalyst containing 5 to 30 wt. percent of alumina gives superior results not obtainable with other members of the genus.

As pointed out above, the use of solid catalysts in the aniline-formaldehyde condensation leads to a new mixture of controlled isomer content. The actual distribution between the 2,4'- and the 4,4'-forms can be regulated by readily controlled variables, including temperature, choice of catalyst and method of addition of reactants. Thus, with an acid-treated clay catalyst such as Superfiltrol clay, it has been found that the 2,4'-diamine content varies with reaction temperatures from about 32 wt. percent at 100° C. to 95 wt. percent at 250° C. On the other hand, with a synthetic silica-alumina cracking catalyst it has been found that the 2,4'-diamine content ranged from about 19% to about 25% and is insensitive to temperature variation.

It is apparent, therefore, from the above discussion that compositions of a relatively wide range of isomer distribution may be prepared by the methods of this invention. Derivatives of these compositions, such as the diisocyanates, will reflect the same isomeric distribution.

The molar ratio of aniline to formaldehyde may be varied within comparatively wide limits. Thus, for example, from about one to about ten mols of aniline may be employed per mol of formaldehyde. In general, at the lower aniline: HCHO ratios, such as ratios of from about 1:1 to about 2.5:1, the higher polymers will be formed preferentially and the yield of higher polymers is in excess of the yield of dimer. However, as progressively larger amounts of aniline are used, the yield of dimer is progressively increased at the expense of polymer yield. Thus, with aniline to formaldehyde ratios of from about 3:1 to about 10:1 or more, the reaction product will be composed primarily of the dimer. As indicated above, the dimer will be formed as a mixture of the 2,4'- and 4,4'-diamine isomers.

Formaldehyde may be employed in any of its commercially available forms. Thus, formalin, paraformaldehyde, "stabilized" methanol solutions of formaldehyde, etc., may be employed.

The reaction may be conducted in the presence or absence of a solvent. When a solvent is to be employed, it may be any of the conventionally known hydrocarbon solvents or chlorinated hydrocarbons, such as aromatic or aliphatic solvents boiling within the range from about 100° to about 200° C. The solvent should be employed in an amount sufficient to provide a single phase solution of the amine compound.

The reaction conditions to be employed may suitably include a reaction temperature within the range of about 100° to about 300° C., and more preferably within the range of about 120° to about 200° C. The reaction appears to proceed most smoothly with aniline at a temperature within the range of about 125° to about 130° C. when an acid-treated clay, such as Superfiltrol clay, is used as catalyst and about 150°–200° C. when a silica-alumina catalyst is used. The influence of temperature on isomeric distribution has already been discussed.

Pressure is not particularly critical with respect to the process. However, the pressure should be sufficient to provide for liquid phase reaction conditions.

The reaction proceeds smoothly under the above-described conditions, and is normally substantially complete upon addition of the formaldehyde. However, because of the exothermic nature of the reaction, it is normally preferable to add the formaldehyde at a rate such that the desired reaction temperature can be maintained. It is normally possible to bring the reaction to completion within from about five minutes to about one hour in conventional equipment.

The polyaminopolyphenylmethanes of the present invention are recovered from the reaction mixture by any desired means. They are conveniently recovered by filtering the catalyst and removing water and excess aniline under reduced pressure. The bottoms from these operations will consist of diamine and polyamine in proportions depending on the ratio of aniline to formaldehyde, as indicated above. If it is desired to separate the diamine from the polyamine, this is easily accomplished by simple distillation whereby the diamine is flashed from the nonvolatile polyamine residue. The overhead product may be removed, for example, at from about 170° C. to about 200° C., at about 0.5 to about 0.025 mm. Hg pressure and will consist essentially of diaminodiphenylmethane containing from about 15 to about 95 wt. percent of 2,4'-diaminodiphenylmethane and, correspondingly, from about 85 to about 5 wt. percent of 4,4'-diaminophenylmethane.

The dimer and higher products of the present invention are useful for a variety of purposes. For example, they may be utilized as raw materials for the production of the corresponding polyisocyanates.

The thus-prepared polyamines may be converted to the corresponding polyisocyanates in any desired manner. Thus, conventional phosgenation techniques may be employed. If desired, an improved phosgenation process as disclosed in copending Rowton application Ser. No. 335,409, filed Jan. 2, 1964 and entitled, "Polyisocyanate Production," may be employed. Phosgenation may be conducted either on a continuous basis or on a batch basis.

In view of the variation in composition of the starting polyphenylpolyamine that is possible by changing either or both of the dimer-polymer ratio and the 2,4'-diamine and 4,4'-diamine isomer ratios, it is obvious that the corresponding polyisocyanates of this invention will also reflect the structural features. However, it has been discovered within the scope of the present invention that it is the presence of the 2,4'-diisocyanate isomer which is responsible for the novel characteristics of the polyisocyanates of the present invention. Thus, whether the isocyanate is used as a distilled material or as a crude mixture, it is the influence of the 2,4'-isomer that is essential.

When the diaminodiphenylmethane mixture is phosgenated to provide a diisocyanate, the dimer content may vary from about 20 wt. percent to about 100 wt. percent. The latter value is obtained in the case of distilled isocyanates or crude isocyanates from distilled diamine. More usually, however, a range of 40 to 85% is preferred in order that the isocyanate product will have a functionality in excess of two.

Likewise, the 2,4'-isomer content may be varied over a wide range by selecting the corresponding amine prepared and described above. It has been found that, in contrast to pure 4,4'-diphenylmethane diisocyanate, which is a crystalline solid at room temperature, the mixture of diisocyanate isomers containing at least 25 wt. percent of the 2,4'-isomer is a mobile liquid at room temperature. The liquid diisocyanate is processed or used more easily than the crystalline solid 4,4'-isomer.

Another influence of the 2,4'-isomer is to moderate the reactivity of the polyisocyanate. Thus, in accordance with the present invention, it is possible to utilize the socalled "one-shot" technique in preparing rigid urethane foams from the novel isocyanate mixtures of the present invention.

The invention will be further illustrated by the following specific examples which are given by way of illustration and not as limitations on the scope of this invention.

*Example I*

In a three-necked flask equipped with mechanical stirrer, thermometer, reflux condenser, nitrogen inlet tube and addition funnel, were placed 280 g. of aniline (three mols) and 28 g. of Superfiltrol acid-washed clay catalyst. The system was swept with a slow stream of nitrogen and the temperature was raised to 125°–130° C. Forty-one grams of formalin solution (37% by weight HCHO, 0.5 mol) was added during 30 minutes and water was removed continuously by means of a Dean-Stark type trap. The temperature of the reaction mixture was maintained at 125° C. for an additional 30 minutes and then the catalyst was removed by filtration.

Distillation of the filtrate at reduced pressure gave 177 g. of unreacted aniline and 96 g. of residue, which was light yellow in color. This residue on distillation at 0.05 mm. Hg gave 81 g. (84% yield) of material boiling at 175°–185° C. which solidified to a white crystalline product (the diaminodiphenylmethane) and 14 g. of nonvolatile residue (higher molecular weight aniline-HCHO condensation products).

The product had a neutral equivalent of 101 (calculated for the diaminodiphenylmethanes, 99) and melted at 66° C. An infrared analysis of the product showed that it contained 41% of the 2,4'-isomer.

*Example II*

The experiment of Example I was repeated except onehalf as much catalyst was used and the reaction temperature was kept at 150°–160° C.

Distillation of the mixture gave 174 g. unreacted aniline, 83 g. diaminodiphenylmethanes and 13 g. of nonvolatile polymeric aniline-formaldehyde condensation products. The diaminodiphenylmethanes contained 58% of the 2,4'-isomer, according to quantitative infrared analysis.

*Example III*

The experiment of Example I was repeated except onehalf as much catalyst was used and the temperature was maintained at 100° C. On distillation of the reaction mixture, there was obtained 205 g. of unreacted aniline, 44 g. of diaminodiphenylmethanes and 34 g. of non-volatile residue. The diamine thus obtained contained 32% by weight of the 2,4'-isomer and 68% by weight of the 4,4'-isomer.

*Example IV*

A one-gallon, stainless steel, stirred autoclave was charged with 3,350 g. of aniline (36 mols) and 168 g. of Superfiltrol clay, flushed with nitrogen, and heated to 250° C. Over a two-hour period was added 675 ml. of formalin solution (37% HCHO=9 mols) and the reaction mixture was heated for one hour longer. The catalyst was filtered, water and excess aniline were removed by distillation at reduced pressure. The resulting residue was further distilled at low pressure and found to consist of 67% of diaminodiphenylmethane and 33% of higher molecular weight condensation products. The diamine was found by quantitative infrared analysis to consist of 94% of the 2,4'-isomer and 6% of the 4,4'-isomer.

*Example V*

When 558 g. of aniline (six mols) and 33 g. of flake paraformaldehyde (91% HCHO=1 mol) were reacted in the presence of 28 g. of silica-magnesia fluidized cracking catalyst, work-up of the product provided 359 g. of excess aniline and 200 g. of residue (100% yield). The residue was found by vacuum distillation to consist of 87% diaminodiphenylmethanes and 13% of higher molecular weight aniline-formaldehyde condensation products. The diamine comprised 22% of the 2,4'-isomer and 78% of the 4,4'-isomer as determined by quanitative infrared analysis.

*Example VI*

In the equipment described in Example I were placed 186 g. of aniline (two mols) and 10 g. of Superfiltrol acid clay catalyst. The mixture was heated to 125°–130° C. under a nitrogen sweep and 81 g. of formalin (one mol HCHO) was added over a one-hour period. The reaction was continued for one-half hour after completion of addition of formalin. The catalyst was then filtered from the hot mixture.

Distillation gave 41 g. unreacted aniline, 73 g. volatile diamine and 71 g. non-volatile polymers.

This experiment illustrates that a 2:1 mol ratio of aniline to formaldehyde can be used conveniently with a solid catalyst to yield a product containing an increased proportion of polyamines.

*Example VII*

The experiment of Example VI was repeated except a mol ratio of 1.35:1 of aniline to formaldehyde was used. It was necessary to add a solvent (o-dichlorobenzene) in order to maintain a fluid system so that catalyst could be filtered.

The mixture was distilled at reduced pressure to remove solvent and unreacted aniline. The residue, weighing 152 g., was further fractionated at 0.5 mm. Hg to give 20 g. volatile diamine and 130 g. non-volatile polyamines.

*Example VIII*

A one-gallon, stainless steel, stirred autoclave was charged with 1,256 g. of aniline (13.5 mols) and 62 g. of fluidized silica-alumina cracking catalyst. The autoclave was flushed with nitrogen and heated to 200° C. Over a two-hour period, 450 ml. of aqueous formalin solution (37% HCHO=6 mols) was added. Heating was continued at 200° C. for two hours after addition of formalin. The catalyst was filtered and water and excess aniline were removed from the filtrate by distillation at reduced pressure. There was obtained 911 g. of residue consisting of 43.3% diaminodiphenylmethane and 56.7% of higher molecular weight aniline-formaldehyde condensation products. The diamine contained 37% of the 2,4'-isomer and 63% of the 4,4'-isomer.

This example illustrates a preferred embodiment of the invention for preparation of a polyamine containing substantial amounts of higher molecular weight condensation products.

*Example IX*

Four hundred sixty-five grams of aniline (five mols) was contacted with 68 g. of 37% formalin solution (0.83 mol HCHO) in a nitrogen atmosphere at 150° C. in the presence of 24 g. of vanadium oxide catalyst.

After one hour, the catalyst was filtered from the reaction mixture and the filtrate was distilled at reduced pressure, giving 333 g. of aniline (3.58 mols) and 90 g. of a non-volatile polymeric residue.

This example shows that a typical transition metal oxide, vanadium oxide, is unsatisfactory as a catalyst for forming diaminodiphenylmethane.

Example X

The polyamine phosgenated in this example was prepared by adding 37% aqueous formalin to a mixture of aniline and Superfiltrol activated clay at 130° C. (aniline: HCHO molar ratio, 6:1) as in Example I. The product contained 89% diamine of which 47% was the 2,4'-isomer.

A solution of 200 g. of the above polyamine in 1,200 g. of monochlorobenzene was run into a solution of 350 g. of phosgene dissolved in 1,900 g. of monochlorobenzene while maintaining the temperature at 25°–30° C.

The resulting slurry was heated rapidly to 110°–120° C. while passing a slow stream of phosgene through the reaction mixture. When there was no longer any solid material in the flask, the reaction was halted. A total of 650 g. of phosgene had been used. Excess phosgene was removed with a stream of dry nitrogen and solvent was removed by flash evaporation.

The residue weighed 248 g. (theory 250 g.) and was a dark, fairly fluid liquid with the following properties:

—NCO content (theory 8.0) _____meq./gm\_\_ 7.58
Hydrolyzable Cl _____percent\_\_ 0.28
Viscosity, cps. at 25° C. _____ 35

Example XI

The polyamine phosgenated in this example was prepared by reacting 37% aqueous formalin with aniline in the presence of a silica-alumina catalyst (aniline: HCHO molar ratio, 2.25:1) at 200° C. The polyamine contained 43.3% dimer of which 37% was the 2,4'-isomer. A solution of 200 g. of this polyamine in 1,400 g. monochlorobenzene was run into a solution of 400 g. phosgene dissolved in 1,600 g. monochlorobenzene while maintaining the temperature at 25°–30° C. The resulting slurry was further phosgenated as described in Example X, yielding 246 g. product polyisocyanate.

—NCO content _____ meq./gm\_\_ 7.72
Hydrolyzable Cl _____percent\_\_ 0.85
Viscosity, cps. 25° C. _____ 231

Example XII

The polyamine to be phosgenated in this example was prepared by the condensation of aniline and paraformaldehyde at a molar ratio of 2.5:1 and at 175° for five hours over silica-alumina catalyst. The product contained 61 wt. percent dimer of which 22.5% was the 2,4'-isomer.

The phosgenation of 200 g. of this polyamine was performed as in Example X, yielding 248 g. of a fairly light-colored, crude polyisocyanate with the following properties:

—NCO content (theory 8.0) _____meq./gm\_\_ 7.72
Hydroyzable Cl _____percent\_\_ 0.41
Viscosity, cps. at 25° C. _____ 53

Example XIII

The amine to be phosgenated in this example was a distilled diamine prepared over Superfiltrol clay and containing 34.8 wt. percent of the 2,4'-isomer.

Phosgenation of 200 g. of this diamine yielded 250 g. of a light-colored liquid diisocyanate with the following properties:

—NCO content (theory 8.0) _____meq./gm\_\_ 7.96
Hydrolzyable Cl _____percent\_\_ 0.31

Example XIV

A crude diisocyanate was prepared from a distilled diamine containing approximately 50 wt. percent of the 2,4'-isomer of diaminodiphenylmethane. Four hundred grams of the crude diisocyanate was flash distilled at ~0.5 mm. Hg. The volatile distillate weighed 315 g. and was a light yellow, low viscosity material which remained liquid at room temperature. The following physical properties were observed:

—NCO content (theory 8.0) _____meq./gm\_\_ 7.98
$n(25/D)$ _____ 1.6011
$d(20/20)$ _____ 1.2061
Hydrolyzable Cl _____percent\_\_ 0.06

An infrared spectrum showed a high 2,4'-isomer content, as indicated by a strong absorption band at 13.2μ.

Example XV

A rigid polyurethane foam was prepared from the polyisocyanate described in Example XII, using the following formulations (parts by weight): 194 parts of crude isocyanate, 192 parts of Tetrol MG–525 (a polyoxypropylene polyol based on methyl-glucoside), 64 parts of Freon–11, 4 parts of silicone oil and 1.5 parts of 2-methyl-(2.2.2)-diazabicyclooctane. The following properties were found:

Cream time, sec. _____ 40
Rise time, sec. _____ 150
Tack-free time, sec. _____ 150
Density, lb./ft.$^3$ _____ 1.91
Compressive strength, p.s.i. _____ 26.58
Tensile strength, p.s.i. _____ 52.3
Heat distortion temp., ° C. _____ 172.0

Dimensional stability

158° F., 100% R.H.— Percent
  12 hours:
    Vol. change _____ +2.33
    Wt. change _____ —1.26
  24 hours:
    Vol. change _____ +3.55
    Wt. change _____ —0.75
  1 week:
    Vol. change _____ +5.38
    Wt. change _____ —1.76
0° F., dry—
  1 week:
    Vol. change _____ —1.03
    Wt. change _____ 0.0
180° F., dry—
  1 week:
    Vol. change _____ +1.83
    Wt. change _____ 0.0

Having thus described my invention, what is claimed is:

1. A composition of matter comprising a mixture of polyisocyanates represented by the following formulae:

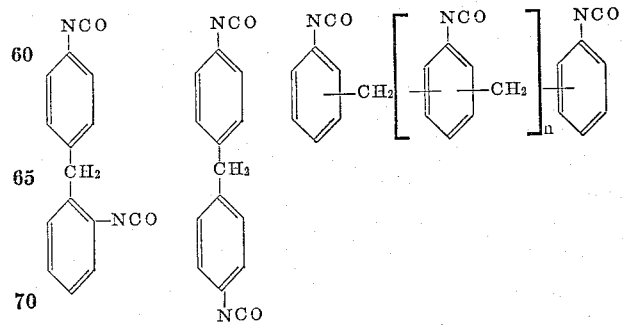

wherein $n$ in the formula for the polymer is an integer having a value of 1 to 3, said mixture containing from 20% to 100% by weight of the two isomeric dissocyanates combined of which 20% to 95% by weight is 2,4'-isomer.

2. A composition as in claim 1 wherein $n$ has an average value of about 1.

3. A composition of matter as in claim 2 in which the mixture contains 100% by weight of dissocyanates.

4. A composition as in claim 3 wherein the 2,4'-isomer content is about 30 to 95 wt. percent.

References Cited

UNITED STATES PATENTS

| | | | |
|---|---|---|---|
| 2,683,730 | 7/1954 | Seeger et al. | 260—453 |
| 2,818,433 | 12/1957 | Erickson | 260—570 |
| 2,950,263 | 8/1960 | Abbotson et al. | 260—453 X |

CHARLES B. PARKER, *Primary Examiner.*

D. H. TORRENCE, *Assistant Examiner.*